United States Patent
Suzuki

[11] Patent Number: 6,154,348
[45] Date of Patent: *Nov. 28, 2000

[54] MAGNETORESISTIVE HEAD AND METHOD OF INITIALIZATION HAVING A NON-PLANAR ANTI-FERROMAGNETIC LAYER

[75] Inventor: Tetsuhiro Suzuki, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/099,529

[22] Filed: Jun. 18, 1998

[30] Foreign Application Priority Data

Jun. 30, 1997 [JP] Japan .................................. 9-174748

[51] Int. Cl.$^7$ ........................................ G11B 5/33
[52] U.S. Cl. ......................................... 360/324
[58] Field of Search .............................. 360/113, 324, 360/324.11, 324.12

[56] References Cited

U.S. PATENT DOCUMENTS

| | | | |
|---|---|---|---|
| 4,713,708 | 12/1987 | Krounbi et al. | 360/113 |
| 4,785,366 | 11/1988 | Krounbi et al. | 360/113 |
| 5,159,513 | 10/1992 | Dieny et al. | 360/113 |
| 5,287,238 | 2/1994 | Baumgart et al. | 360/113 |
| 5,422,571 | 6/1995 | Gurney et al. | 360/113 |
| 5,508,867 | 4/1996 | Cain et al. | 360/113 |
| 5,793,279 | 8/1998 | Nepela | 360/113 |

FOREIGN PATENT DOCUMENTS

| | | |
|---|---|---|
| 4-358310 | 12/1992 | Japan . |
| 8-45032 | 2/1996 | Japan . |
| 8-221719 | 8/1996 | Japan . |

*Primary Examiner*—David Davis
*Attorney, Agent, or Firm*—McGinn & Gibb, P.C.

[57] ABSTRACT

A magnetoresistive head includes a first ferromagnetic layer and a non-magnetic material layer adjacent to a center portion of the first ferromagnetic layer. A second ferromagnetic layer is provided adjacent to the non-magnetic metal layer. An anti-ferromagnetic layer covers the second ferromagnetic layer and the first ferromagnetic layer. The anti-ferromagnetic layer is non-planar at an area adjacent to the non-magnetic metal layer and the second ferromagnetic layer. A pair of electrodes is provided adjacent to the two edges of the anti-ferromagnetic layer.

20 Claims, 5 Drawing Sheets

MAGNETORESISTIVE HEAD AND METHOD OF INITIALIZATION HAVING A NON-PLANAR ANTI-FERROMAGNETIC LAYER

BACKGROUND OF THE INVENTION

1. Field of the Invention

This invention concerns a magnetoresistive head and initialization method therefor, and more particularly concerns a magnetoresistive head in which the giant magnetoresistivity (GMR) effect is utilized, and an initialization method therefor.

2. Description of the Related Art

MR heads wherein the magnetoresistivity effect is employed exhibit high magnetic-field responsiveness and sensitivity, and hence are used in high-density magnetic recording apparatuses. In conventional MR heads, magnetic films are used which exhibit an anisotropic magnetoresistivity (AMR) effect for the magnetoresistive material. In such an AMR-type MR head, the electrical resistance is proportional to the current supplied to the magnetoresistive material and to the square of the cosine of the angle at which the magnetoresistive material magnetizes. In a magnetic recording apparatus, the magnetic field of the signal from the magnetic recording medium changes the direction of magnetization in the magnetoresistive material. This change, in turn, induces changes in the resistance value of the magnetoresistive material and in the currents and voltages sensed. Thus it is possible to read recorded data from the magnetic recording medium.

Recently, the giant magnetoresistivity (GMR) effect has been discovered in materials that exhibit even greater magnetoresistivity. The essential characteristic of these materials is that at least two ferromagnetic metal layers are separated by a non-ferromagnetic metal layer. This GMR effect is observed in Fe/Cr or Co/Cu multilayer film systems which exhibit strong anti-ferromagnetic coupling in the ferromagnetic layers, and in systems wherein the direction of magnetization is fixed or pinned in one of two ferromagnetic metal layers. In the GMR effect, the electrical resistance is proportional to the cosine of the angle subtended by the magnetism in adjacent ferromagnetic layers, and is independent of the current direction.

Figure 5:
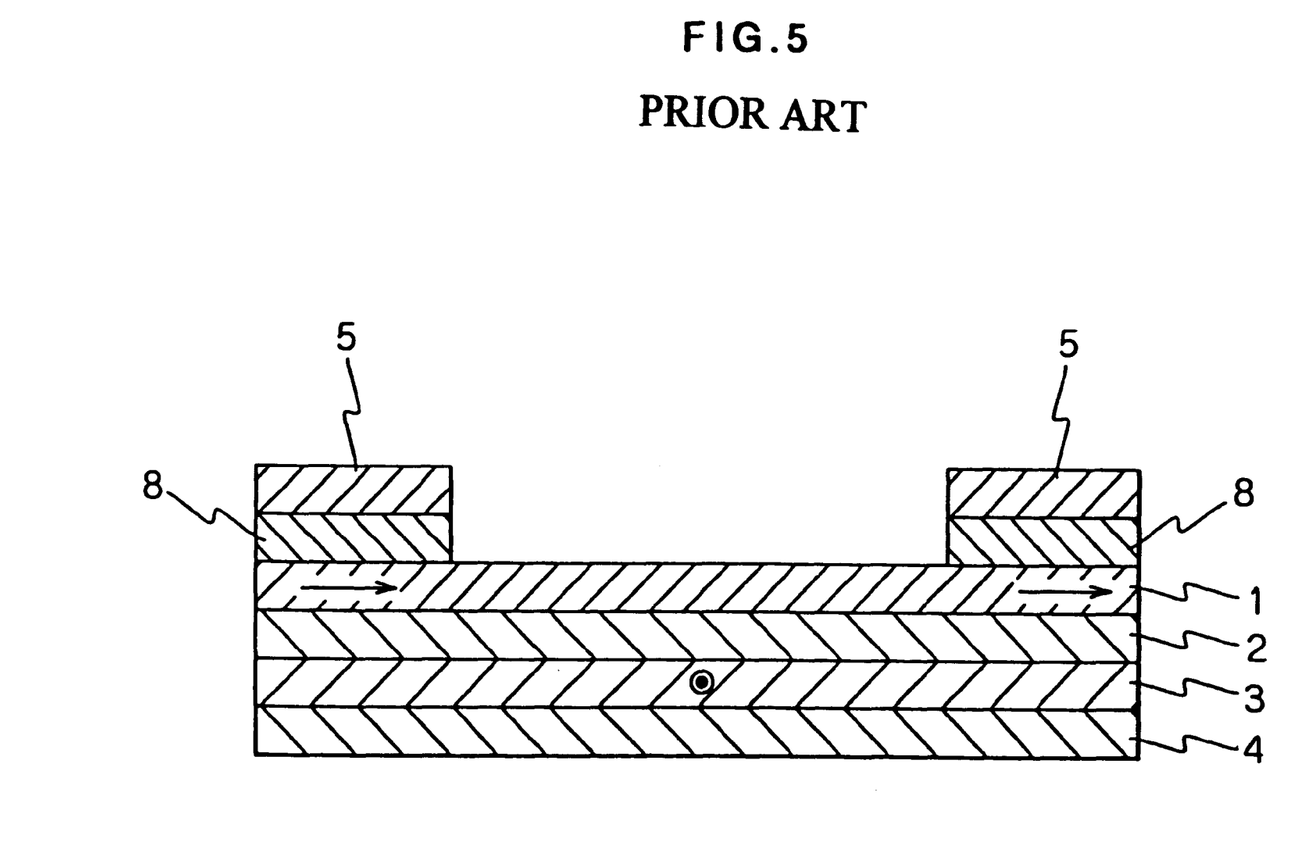
FIG. 5 is a cross-sectional view showing the configuration of a conventional giant magnetoresistive effect head.

A magnetic head in which such a GMR effect is employed is disclosed in Laid-Open Patent Application H4-358310 [1992] (in gazette). FIG. 5 is a cross-sectional diagram of one example of a conventional magnetic head wherein the GMR effect is used. A magneto-sensitive portion that senses signal fields comprises a first ferromagnetic layer 1 and a second ferromagnetic layer 3 separated by a non-magnetic metal layer 2, and an anti-ferromagnetic layer 4 for pinning the magnetism of the second ferromagnetic layer by exchange coupling. The magnetization in the first ferromagnetic layer 1 that is unpinned and free is established so as to be perpendicular to the magnetization in the second ferromagnetic layer 2 that is pinned. When the magnetization of the pinned second ferromagnetic layer 3 is parallel to the direction of the signal field 22, and the magnetization of the free first ferromagnetic layer 1 is perpendicular to the signal field 22, the linear response is the greatest, and the dynamic range is the widest. At such times, only the magnetization in the first ferromagnetic layer 1 turns freely, the angle between the two-layer magnetization changes, and this is sensed as a change in resistance. Also, as means for creating a vertical bias field to hold the first magnetic layer in a single domain state, an anti-ferromagnetic layer 8 is provided adjacent to the edges of the first ferromagnetic layer.

Thus, in conventional magnetic heads using the GMR effect, the direction of pinning the second ferromagnetic layer differs from the vertical bias direction. Here, in order to pin the ferromagnetic layer using an anti-ferromagnetic layer, a film must be formed wherein a ferromagnetic layer is in contact with an anti-ferromagnetic layer, and this must be heated to near the blocking temperature of the anti-ferromagnetic layer in a magnetic field. When that is done, the two anti-ferromagnetic layers must have sufficiently different blocking temperatures. The reason for this is that, when the blocking temperatures are similar, between the process of heating in a magnetic field to perform pinning on the second ferromagnetic layer and the process of heating in a magnetic field to pin the vertical bias direction, only the pinning direction in the process performed later than the other will be effective. For this reason, there is a troublesome aspect in that the two anti-ferromagnetic layers must be formed of materials having sufficiently different blocking temperatures.

SUMMARY OF THE INVENTION

An object of the present invention is to lower the manufacturing cost involved in achieving the objectives noted in the foregoing by using the same material both for the anti-ferromagnetic layer for pinning the second ferromagnetic layer and for the anti-ferromagnetic layer for applying the vertical bias field.

To this end, in the present invention, a non-magnetic metal layer is formed adjacent to the center of a first ferromagnetic layer, a second ferromagnetic layer is formed adjacent to that non-magnetic metal layer, an anti-ferromagnetic layer is formed so as to cover the second ferromagnetic layer and the first ferromagnetic layer, and a pair of electrodes is formed at the two edges of the anti-ferromagnetic layer.

In the present invention, after fabricating a magnetoresistive head in a state wherein the direction of the vertical bias field in the first ferromagnetic layer and the direction of magnetization in the second ferromagnetic layer are aligned, the magnetization direction in the second ferromagnetic layer is converted so that it becomes perpendicular to the direction of the vertical bias field in the first ferromagnetic layer. By so doing, after forming the anti-ferromagnetic layer films, the magnetization direction in the second ferromagnetic layer can be made to coincide with the direction of the vertical bias field in the first ferromagnetic layer, whereupon there is no problem with the overall anti-ferromagnetic layer blocking temperatures being similar. For this reason, the same material can be used in forming the anti-ferromagnetic layers, thus facilitating cost reduction.

The initialization method is as follows. After fabricating the magnetoresistive head described above, a prescribed current is made to flow through the electrodes, setting the direction of magnetization in the second ferromagnetic layer. More specifically, at this time, in terms of the prescribed current, a pulsating current is made to flow which is larger than the current detected in the signal field.

In the present invention, when a pulsating current that is larger than the current detected in the signal field is made to flow in the electrodes, by means of the current magnetic field and an instantaneous heat-treatment effect, only the direction of pinning in the second ferromagnetic layer is determined in the direction of the current magnetic field. At that time, in the edges of the first ferromagnetic layer, the current density will be small as compared to the magneto-sensitive portion, and the heat-treatment effect will be small, so that the pinning direction is maintained as it was initially.

Also, in another invention, in the magnetoresistive head described above, horizontal bias field application layer are provided for applying a horizontal bias field to the first ferromagnetic layer.

In this invention, from a condition wherein the direction of the vertical bias field in the first ferromagnetic layer and the direction of magnetization in the second ferromagnetic layer are aligned, a horizontal bias field is applied to the first ferromagnetic layer so as to convert the magnetization direction in the second ferromagnetic layer to a different orientation relative to the direction of the bias field of the first ferromagnetic layer.

In yet another invention, the anti-ferromagnetic layer is formed of a single material.

In this invention, the anti-ferromagnetic layer or layers are integrally formed, wherefore the fabrication process is made shorter than with the prior art and costs are reduced.

In yet another invention, the horizontal bias field application layer comprise a non-magnetic layer.

Alternatively, the horizontal bias field application layer comprise a non-magnetic layer and a soft magnetic layer. Alternatively, the horizontal bias field application layer comprise a non-magnetic layer and a permanent magnet layer. Alternatively, the anti-ferromagnetic layer is formed of material selected from among either a group of materials having as their main component FeMn, NiMn, or IrMn, or a group of materials having as their main component an oxide of Fe, Co, or Ni. Alternatively, the first ferromagnetic layer is formed of materials selected from a group made up of Fe, Co, Ni, and alloys of Fe, Co, and Ni. Alternatively, the second ferromagnetic layer is formed of materials selected from a group made up of Fe, Co, Ni, and alloys of Fe, Co, and Ni. Alternatively, the non-magnetic metal layer is formed of materials selected from a group made up of Cu, Ag, Au, and alloys of Cu, Ag, and Au.

By so doing, it is possible to make the anti-ferromagnetic layer common for both the first and second ferromagnetic layers, and, beginning with a condition wherein the directions of magnetization in the first and second ferromagnetic layers are aligned, to make these two directions of magnetization different, either by a special initialization method, or by horizontal bias field application layer. Therefore, when forming the anti-ferromagnetic layer films, there is no problem if the bias directions or magnetization directions in the first and second ferromagnetic layers are the same. That being so, it becomes possible to form the anti-ferromagnetic layers of the same material, and thus to reduce manufacturing costs. And, when the anti-ferromagnetic layer films are formed integrally, the manufacturing costs can be further reduced by simplifying the manufacturing process.

Moreover, when the second ferromagnetic layer pinning direction is made the direction of the signal field by passing a large sense current through the head, the region of temperature rise is restricted to the magneto-sensitive portion, so there is no danger of adversely affecting either the other parts configuring the magnetic head, such as the magnetic shield, or the magnetic properties of the recording head.

Furthermore, when layer are added for applying a horizontal bias field, the initializing process using a current can be omitted, and the fabrication process can be simplified.

DESCRIPTION OF THE PREFERRED EMBODIMENTS

A first embodiment aspect of the present invention is now described in detail, making reference to the drawings.

Figure 1:
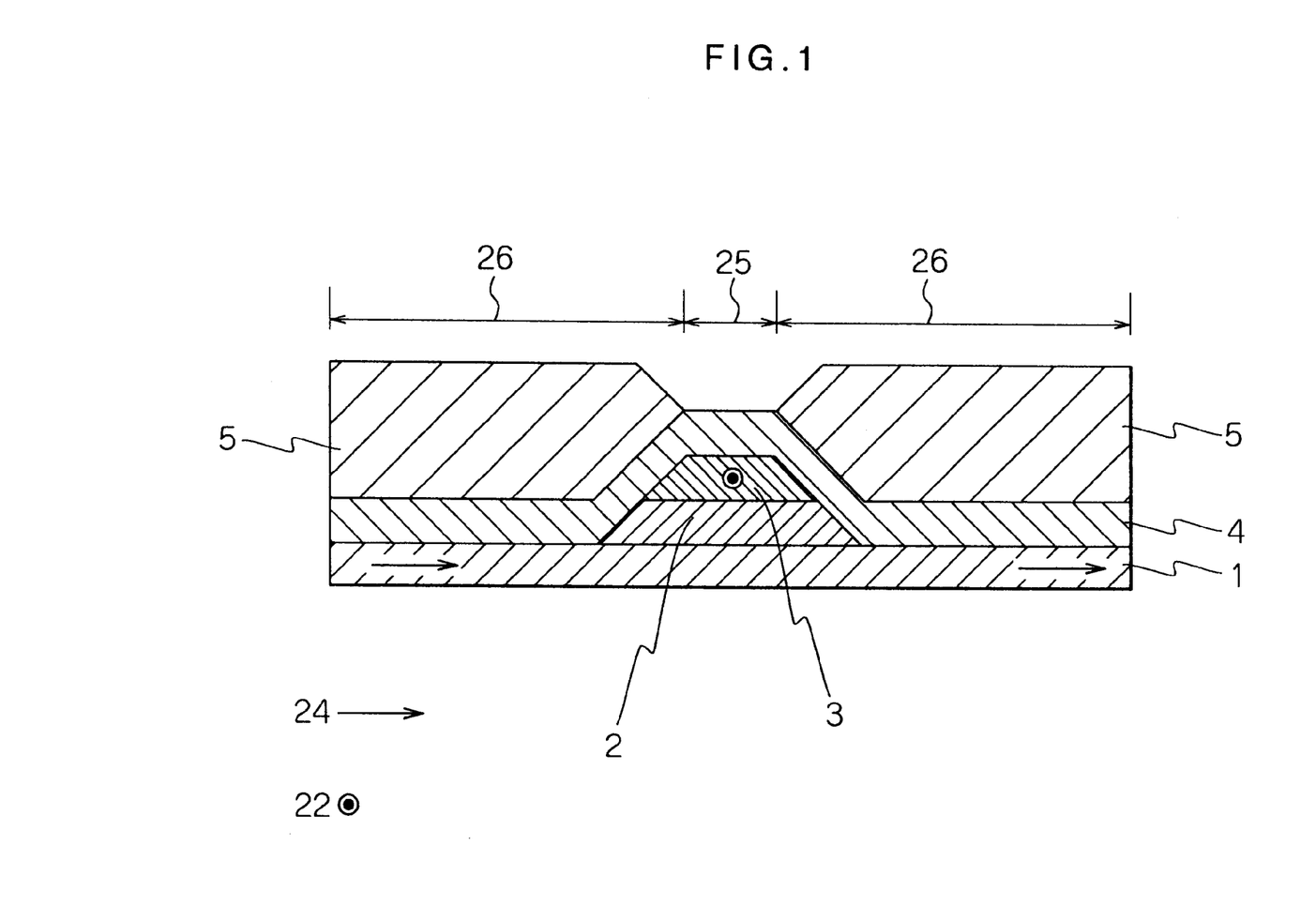
FIG. 1 is a cross-sectional view of a first embodiment aspect of the magnetoresistive head of the present invention.

FIG. 1 is a cross-sectional view showing the configuration of the first embodiment aspect of the present invention. In FIG. 1, the magneto-sensitive portion 25 refers to that region which comprises a first ferromagnetic layer 1, a non-magnetic metal layer 2, a second ferromagnetic layer 3, and an anti-ferromagnetic layer 4, and which is enclosed by the electrodes 5. The edges 26 refer to those portions comprising the electrodes 5, anti-ferromagnetic layer 4, and first ferromagnetic layer 1. The first ferromagnetic layer 1 and second ferromagnetic layer 3 forming the edges 26 are subjected to pinning by exchange coupling with the anti-ferromagnetic layer 4. The pinning magnetic field is fixed in the track width direction 24 either when the films are formed or subsequently by annealing in a magnetic field.

However, by passing through the electrodes a sense current larger than the current passed when operating the head, the pinning direction for the second ferromagnetic layer is fixed in the direction of the current magnetic field, that is, the signal field direction 22. For the first ferromagnetic layer 1, the non-magnetic metal layer 2, and the second ferromagnetic 3, a combination of materials exhibiting the GMR effect can be used. For the first ferromagnetic layer 1 and the second ferromagnetic layer 3, materials selected from a group made up of Fe, Co, Ni, or from alloys of Fe, Co, and Ni can be used. For the non-magnetic metal layer 2, materials selected from a group made up of Cu, Ag, Au, or from alloys of Cu, Ag, and Au can be used. And for the anti-ferromagnetic layer 4, materials selected either from a group made up of FeMn and NiMn or from a group made up of oxides of Ni, Co, and Fe can be used.

Next, the action of the first embodiment aspect of the present invention is described, making reference to the drawings.

The first ferromagnetic layer 1 and the second ferromagnetic layer 3 are fixed in the track width dimension, either during film formation or subsequently by annealing in a magnetic field. After that, by the current magnetic field produced by passing a sense current larger than the current passed when operating the head through the electrodes 5 and an instantaneous heat-treatment effect, only the pinning direction in the second ferromagnetic layer 3 is fixed in the direction of the current magnetic field, that is, in the signal field direction 22. When that is done, the current density in the edges 26 of the first ferromagnetic layer 1 is small compared to that in the magneto-sensitive portion 25, and the heat-treatment effect is slight, so the pinning direction continues to be maintained in the track width direction 24. In the first embodiment aspect of the present invention, the sense current, magnetostatic fields of the first and second ferromagnetic layers 2 and 3, respectively, and inter-layer exchange magnetic field are optimized so that the magnetization of the first ferromagnetic layer 1 of the magneto-sensitive portion 25 is oriented more or less in the track width direction when the signal field is 0. Also, the first ferromagnetic layer 1 turns relative to the signal field, and an output that is proportional to the cosine of the angle subtended with the magnetization of the fixed second ferromagnetic layer 3 is observed. Further, the first ferromagnetic layer 1 is acted on by a vertical bias due to the pinned portion or portions, and is held in a single domain state.

The effectiveness of the first embodiment aspect of the present invention is described next. In the first embodiment aspect of the present invention, the same materials are used in the anti-ferromagnetic layer 4 for imparting a vertical bias in the first ferromagnetic layer 1 and in the anti-ferromagnetic layer 4 for pinning the second ferromagnetic layer 3, and these layer films are formed simultaneously, wherefore the number of targets used in film formation can be reduced, so that magnetoresistive heads can be obtained at low cost. Also, a large current is passed to make the pinning direction in the second ferromagnetic layer 3 the same as the signal field direction, wherefore the region of temperature rise is limited to the magneto-sensitive portion 26, and there is no danger of the other parts comprising the magnetic head, namely the magnetic shield, or of the magnetic properties of the recording head, being adversely affected.

A second embodiment aspect of the present invention is now described in detail, making reference to the drawings.

Figure 2:
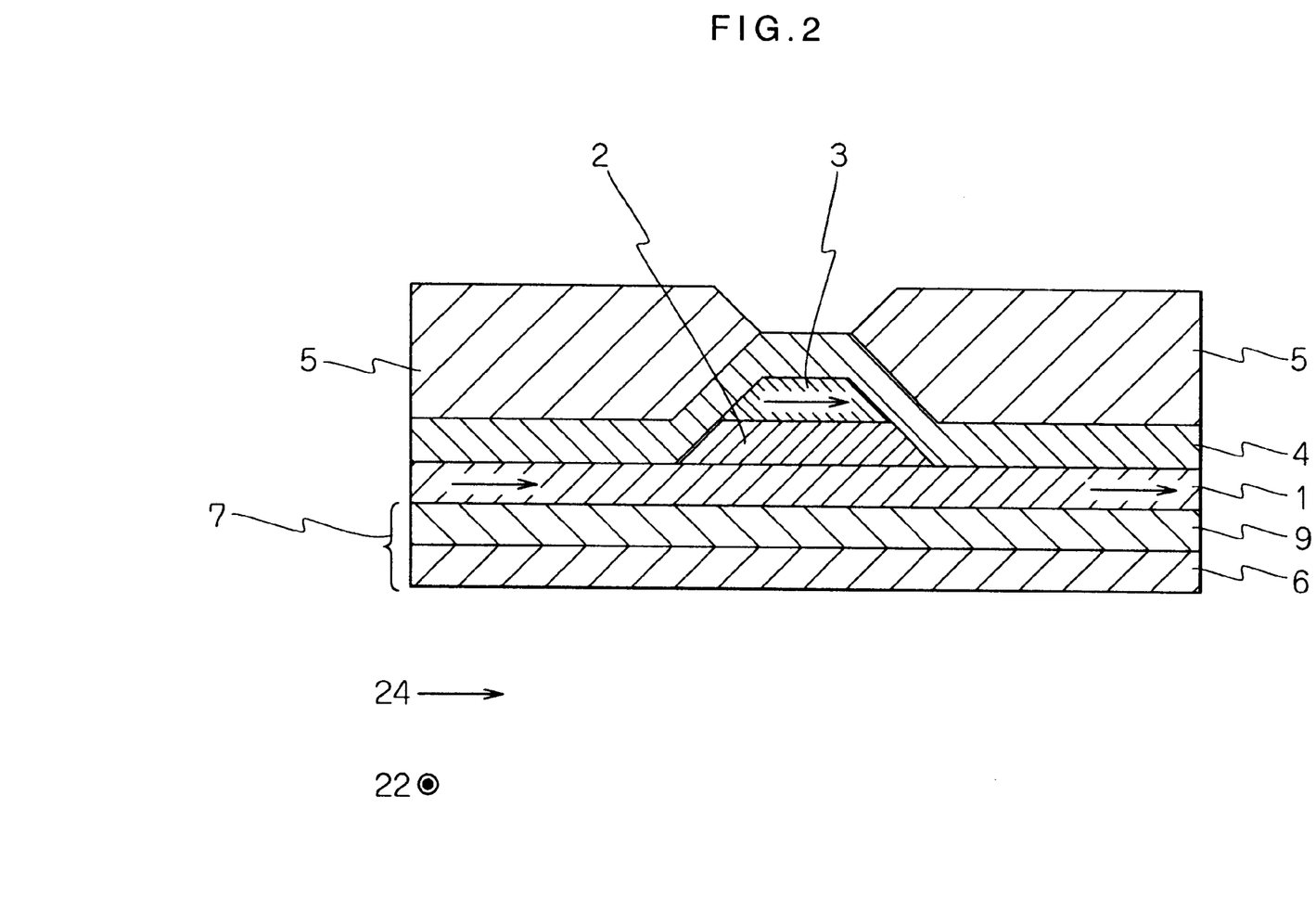
FIG. 2 is a cross-sectional view of a second embodiment aspect of the magnetoresistive head of the present invention.

FIG. 2 is a cross-sectional view showing the configuration of the second embodiment aspect of the present invention. In FIG. 2, a magneto-sensitive portion comprises a first ferromagnetic layer 1, non-magnetic metal layer 2, second ferromagnetic layer 3, anti-ferromagnetic layer 4, non-magnetic separation layer 9, and soft magnetic layer 6. Of these, the configuration of the first ferromagnetic layer 1, non-magnetic metal layer 2, second ferromagnetic layer 3, and anti-ferromagnetic layer 4 is the same as in the first embodiment aspect of the present invention. The non-magnetic separation layer 9 is provided for the purpose of cutting the exchange coupling between the ferromagnetic layer 1 and the soft magnetic layer 6. The soft magnetic layer 6 is magnetized by the current magnetic field, and supplies a horizontal bias field to the first ferromagnetic layer 1.

For the anti-ferromagnetic separation layer 9, a metal such as Ta, Ti, or Cu, or an insulating layer such as $SiO_2$ or $Al_2O_3$ can be used. For the soft magnetic layer, use can be made of alloys of Ni, Fe, Co, with or without additives, or of an amorphous metal having Co as the main component.

The action of the second embodiment aspect of the present invention is now described, with reference to the drawings.

The first ferromagnetic layer 1 and the second ferromagnetic layer 3 are fixed in the track width direction during film formation or subsequently by annealing in a magnetic field.

In the second embodiment aspect of the present invention, the pinning direction in the second ferromagnetic layer 3 is maintained in the track width direction 24 without subjecting it to turning by passing a large current. The sense current, the inter-layer exchange magnetic field between the first and second ferromagnetic layers 1 and 3, respectively, and the magnetostatic field between the first ferromagnetic layer 1 and the soft magnetic field 6 are optimized so that the magnetization of the first ferromagnetic layer 1 in the magneto-sensitive portion subtends an angle of approximately 45 degrees to the track width direction when the signal field is 0. The first ferromagnetic layer 1 turns, relative to the signal field, and an output that is proportional to the cosine of the angle subtended with the magnetization in the second ferromagnetic layer 3 fixed in the track width direction 24 is observed. The first ferromagnetic layer 1 is acted on by a vertical bias due to the pinned portions of the edges, and is held in a single domain state.

In the second embodiment aspect of the present invention, the purpose of providing the soft magnetic layer 6 and the non-magnetic separation layer 9 is to apply a horizontal bias field in the first ferromagnetic 1, as noted already. That being so, the soft magnetic layer 6 and non-magnetic separation layer 9 may be substituted for by a permanent magnet layer, as known in AMR-type MR heads, or by a shunt layer.

In the second embodiment aspect of the present invention, moreover, the layer for applying the horizontal bias field may be provided adjacent to the anti-ferromagnetic layer 4 instead of the first ferromagnetic layer 1.

The second embodiment aspect of the present invention provides, in addition to the benefits provided by the first embodiment aspect, the benefit of being able to omit the current-based initializing process, by adding layer 7 for applying the horizontal bias field.

Figure 3:
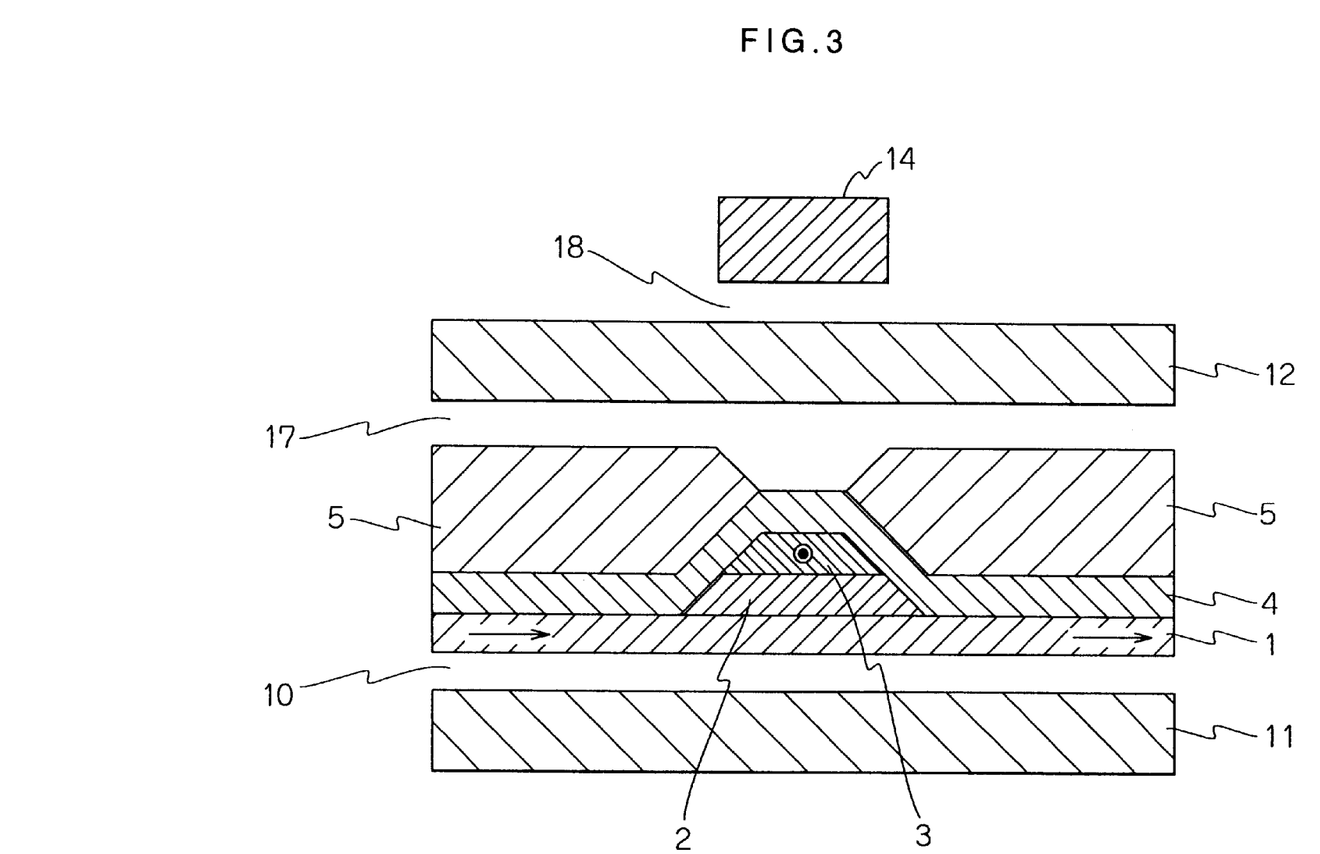
FIG. 3 is a cross-sectional view of a first embodiment of the magnetoresistive head of the present invention.

Specific embodiments of the present invention are now described in detail, making reference to the drawings. FIG. 3 is a cross-sectional view of a first embodiment of the present invention. As diagrammed in FIG. 3, this embodiment of the present invention has a lower shield 11 formed as a film on a non-magnetic ceramic substrate (not shown in the figure), by a plating process, using NiFe of 2 μm thickness, which is patterned by ion milling to a width of 60 μm. Above that, a gap 10 inside the lower shield is formed as a film by sputtering, using $Al_2O_3$ at a thickness of 0.1 μm. Next, sputtering is conducted to form an NiFe film 8 nm thick as the first ferromagnetic layer 1, a Cu layer 2.5 nm thick as the non-magnetic metal layer 2, and an NiFe layer 3 nm thick as the second ferromagnetic layer 3. A stencil-form resist is then applied, after which the edges of the second ferromagnetic layer 3 and intermediate layer 2 are subjected to ion milling, and a magneto-sensitive portion is patterned with a width of 2 μm. After removing the resist, an NiMn film is formed to a thickness of 30 nm by sputtering as the anti-ferromagnetic layer 4. A heat treatment at 260 degrees is done here while applying a magnetic field of 10 kOe in the track width direction 24, thereby applying an exchange magnetic field in the track width direction 24 to the first and second ferromagnetic layers 1 and 3, respectively. After applying a stencil-form resist only to the magneto-sensitive portion, an Au layer is sputtered on to a thickness of 0.2 μm to provide electrodes 5 and the resist is removed. Then the magneto-sensitive portion and the edges are ion-milled in the height dimension and thus patterned. Next, above this, a gap film 17 inside the upper shield is formed by sputtering, using $Al_2O_3$ at a thickness of 0.1 μm. Above that, the upper shield 12 is formed by a plating method, using NiFe at a thickness of 2 μm, and patterned to a width of 60 μm by ion milling. Then the recording part is formed by forming $Al_2O_3$ to a thickness of 0.3 μm as a recording gap layer 18, a coil (not shown), and NiFe at a thickness of 4 μm as the upper pole. The head yielded by this wafer process is then machined, leads are attached, pulsating initializing current three or more times greater than the prescribed sense current is supplied, before supplying the sense current, and the pinning direction in the second ferromagnetic layer is oriented to the direction of the signal field. When the MR head of the first embodiment of the present invention fabricated as per the foregoing was subjected to recording and playback tests, it was found to exhibit outstanding linear response and a playback waveform having good symmetry at high output power.

Figure 4:
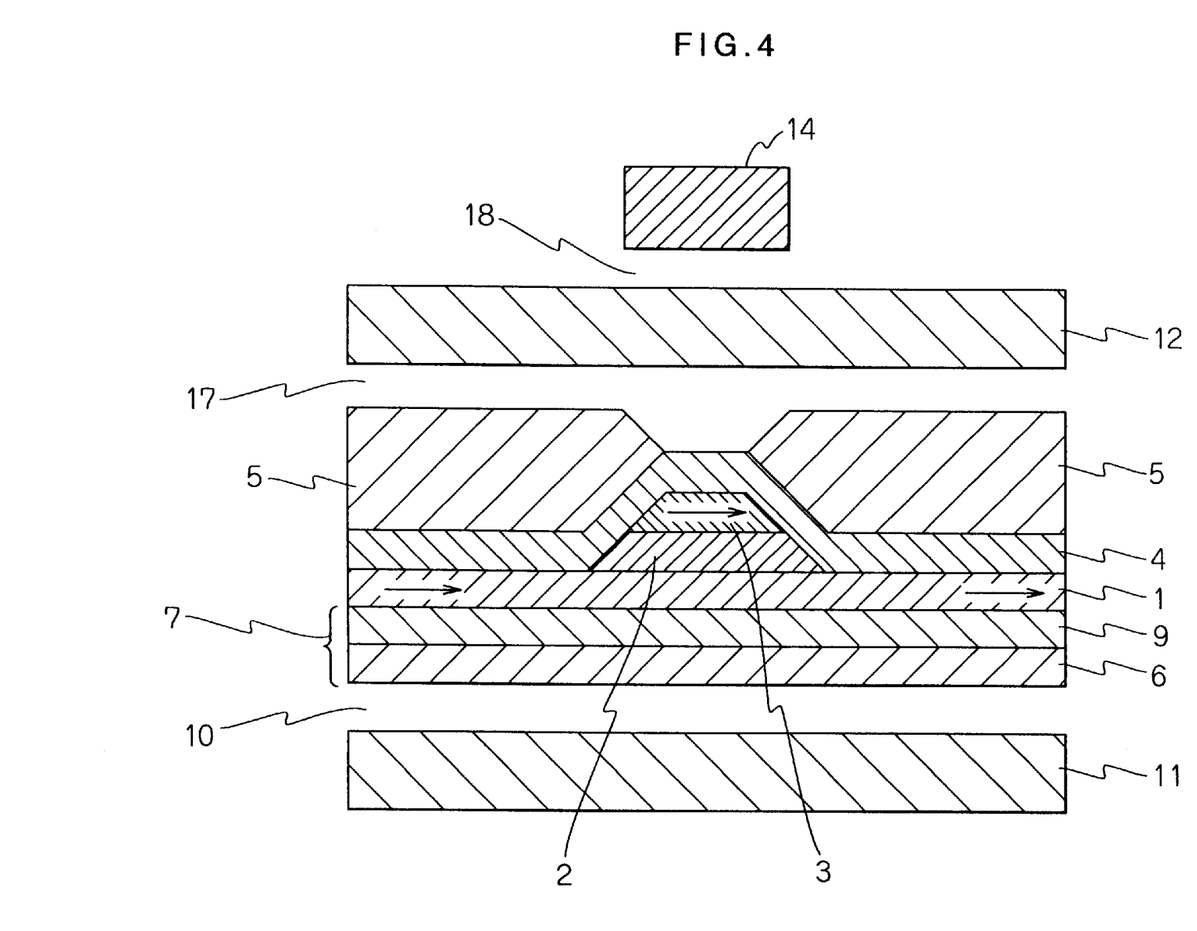
FIG. 4 is a cross-sectional view of a second embodiment of the magnetoresistive head of the present invention.

FIG. 4 is a cross-sectional view of a second embodiment of the present invention. In the following embodiments, moreover, everything up to the gap layer 16 inside the lower shield and everything from the gap layer 17 inside the upper shield on are formed in the same way as in the first embodiment, wherefore no further description thereof is given here. Referring to FIG. 4, in this second embodiment of the present invention, after forming the gap layer inside the lower shield, a sputtering method is used to form CoZrMo to a thickness of 10 nm for the soft magnetic layer 6 and Ta to a thickness of 5 nm as the non-magnetic separation layer.

Next, using a sputtering method, an NiFe film is formed to a thickness of 8 nm as the first ferromagnetic layer 1, a Cu layer is formed to a thickness of 2.5 nm as the non-magnetic metal layer 2, and an NiFe layer is formed to a thickness of 3 nm as the second ferromagnetic layer 3. After applying a stencil-form resist, the edges of the second ferromagnetic layer 3 and intermediate layer 2 are ion-milled and a magneto-sensitive portion is patterned to a width of 2 μm.

The resist is removed, and an NiMn film is sputtered on to a thickness of 30 nm as the anti-ferromagnetic layer 4. A heat treatment at 260 degrees is done here while applying a magnetic field of 10 kOe in the track width direction 24, thereby applying an exchange magnetic field in the track width direction 24 to the first and second ferromagnetic layers 1 and 3, respectively. After applying a stencil-form resist only to the magneto-sensitive portion, an Au layer is sputtered on to a thickness of 0.2 μm to provide electrodes 5, and the resist is removed. Next the magneto-sensitive portion and the edges are ion-milled in the height dimension and thus patterned. Then everything from the gap layer inside the shield on is fabricated as in the first embodiment. When the MR head of the second embodiment of the present invention fabricated as per the foregoing was subjected to recording and playback tests, it exhibited outstanding linear response and a playback waveform having good symmetry at high output power.

What is claimed is:

1. A magnetoresistive head that extends in a longitudinal direction from a first edge of the head to a second edge of the head, the head comprising:
    a first ferromagnetic layer;
    a non-magnetic metal layer adjacent to a center portion of said first ferromagnetic layer;
    a second ferromagnetic layer adjacent to said non-magnetic metal layer and extending in said longitudinal direction from a first edge of the second ferromagnetic layer to a second edge of the second ferromagnetic layer;
    an anti-ferromagnetic layer including a first area, a second area and a third area, said first area covering said second ferromagnetic layer, said second area covering said first ferromagnetic layer and a third area connecting said first area to said second area, wherein said third area of the anti-ferromagnetic layer is non-planar with respect to said first area and said second area at a region adjacent to said non-magnetic metal layer and adjacent to said first edge and said second edge of said second ferromagnetic layer; and
    a pair of electrodes adjacent said first edge of the head and said second edge of the head.

2. A method of initializing the magnetoresistive head according to claim 1, wherein after fabricating said magnetoresistive head, the method comprises passing a prescribed current through said electrodes to set a direction of magnetization in said second ferromagnetic layer, wherein said prescribed current comprises a pulse-form current larger than current detected in a signal field.

3. The magnetoresistive head according to claim 1, wherein said first ferromagnetic layer comprises a horizontal bias field application layer for applying a horizontal bias field to said first ferromagnetic layer.

4. The magnetoresistive head according to claim 1, wherein said anti-ferromagnetic layer is formed of a single material.

5. The magnetoresistive head according to claim 3, wherein said anti-ferromagnetic layer is formed of a single material.

6. The magnetoresistive head according to claim 3, wherein said horizontal bias field application layer comprise a non-magnetic layer.

7. The magnetoresistive head according to claim 3, wherein said horizontal bias field application layer comprise a non-magnetic layer; and a soft magnetic layer.

8. The magnetoresistive head according to claim 3, wherein said horizontal bias field application layer comprise a non-magnetic layer; and a permanent magnet layer.

9. The magnetoresistive head according to claim 1, wherein said anti-ferromagnetic layer is formed of materials selected either from a group having FeMn, NiMn, and IrMn as their main components or from a group having oxides of Ni, Co, and Fe as their main components.

10. The magnetoresistive head according to claim 3, wherein said anti-ferromagnetic layer is formed of materials selected either from a group having FeMn, NiMn, and IrMn as their main components or from a group having oxides of Ni, Co, and Fe as their main components.

11. The magnetoresistive head according to claim 1, wherein said first ferromagnetic layer is formed of materials selected from among a group comprising Fe, Co, Ni, and alloys of Fe, Co, and Ni.

12. The magnetoresistive head according to claim 3, wherein said first ferromagnetic layer is formed of materials selected from among a group comprising Fe, Co, Ni, and alloys of Fe, Co, and Ni.

13. The magnetoresistive head according to claim 1, wherein said second ferromagnetic layer is formed of materials selected from among a group comprising Fe, Co, Ni, and alloys of Fe, Co, and Ni.

14. The magnetoresistive head according to claim 3, wherein said second ferromagnetic layer is formed of materials selected from among a group comprising Fe, Co, Ni, and alloys of Fe, Co, and Ni.

15. The magnetoresistive head according to claim 1, wherein said non-magnetic metal layer is formed of materials selected from among a group comprising Cu, Ag, Au, and alloys of Cu, Ag, and Au.

16. The magnetoresistive head according to claim 3, wherein said non-magnetic metal layer is formed of materials selected from among a group comprising Cu, Ag, Au, and alloys of Cu, Ag, and Au.

17. A magnetoresistive head comprising:
    a first ferromagnetic layer;
    a non-magnetic metal layer provided on a center portion of said first ferromagnetic layer;
    a second ferromagnetic layer provided only on said non-magnetic metal layer;
    a non-planar anti-ferromagnetic layer provided on said second ferromagnetic layer and said first ferromagnetic layer; and
    a pair of electrodes provided at adjacent two edges of said anti-ferromagnetic layer.

18. The magnetoresistive head according to claim 17, wherein said anti-ferromagnetic layer is formed of a single material.

19. The magnetoresistive head according to claim 17, wherein said first ferromagnetic layer comprises a horizontal bias field application layer for applying a horizontal bias field to said first ferromagnetic layer.

20. A method of initializing the magnetoresistive head according to claim 17, wherein after fabricating said magnetoresistive head, the method comprises passing a prescribed current through said electrodes to set a direction of magnetization in said second ferromagnetic layer, wherein said prescribed current comprises a pulse-form current larger than current detected in a signal field.

* * * * *